US008826112B2

(12) United States Patent
Clark et al.

(10) Patent No.: US 8,826,112 B2
(45) Date of Patent: Sep. 2, 2014

(54) NAVIGATING TABLE DATA WITH MOUSE ACTIONS

(75) Inventors: David K. Clark, Cedar Park, TX (US); Mary W. Ferguson, Austin, TX (US); Julie L. Gilbreath, Austin, TX (US); Theodore J. Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2905 days.

(21) Appl. No.: 11/232,771

(22) Filed: Sep. 22, 2005

(65) Prior Publication Data

US 2007/0067710 A1   Mar. 22, 2007

(51) Int. Cl.
*G06F 17/00* (2006.01)
*G06F 17/24* (2006.01)
*G06F 3/0482* (2013.01)

(52) U.S. Cl.
CPC ............ *G06F 3/0482* (2013.01); *G06F 17/246* (2013.01)
USPC .............................. 715/212; 715/825; 715/810

(58) Field of Classification Search
USPC .................. 715/227, 234, 205, 810, 826, 825
See application file for complete search history.

(56) References Cited

U.S. PATENT DOCUMENTS

| | | | |
|---|---|---|---|
| 5,900,870 A | 5/1999 | Malone | |
| 6,437,812 B1 | 8/2002 | Giles | |
| 6,689,946 B2 | 2/2004 | Funaki | |
| 6,779,152 B1 * | 8/2004 | Conner et al. | 715/207 |
| 6,839,575 B2 * | 1/2005 | Ostergaard | 455/566 |
| 6,993,362 B1 * | 1/2006 | Aberg | 455/566 |
| 7,072,984 B1 * | 7/2006 | Polonsky et al. | 709/246 |
| 7,155,670 B2 * | 12/2006 | Takizawa et al. | 715/239 |
| 7,178,111 B2 * | 2/2007 | Glein et al. | 715/848 |
| 7,228,504 B2 * | 6/2007 | Jones et al. | 715/749 |
| 7,231,596 B2 * | 6/2007 | Koren | 715/210 |
| 7,360,175 B2 * | 4/2008 | Gardner et al. | 715/854 |
| 7,634,740 B2 * | 12/2009 | Enomoto et al. | 715/810 |
| 2001/0007959 A1 | 7/2001 | Abdalla | |
| 2002/0118221 A1 | 8/2002 | Hudson | |
| 2002/0122068 A1 * | 9/2002 | Tsuruoka | 345/810 |
| 2003/0007013 A1 | 1/2003 | Gatis | |
| 2003/0146939 A1 | 8/2003 | Petropoulos | |

(Continued)

OTHER PUBLICATIONS

Microsoft EXCL 2003; "EXCEL 2003 using autofilter.pdf"; http://office.microsoft.com/training/training.aspx?AssetID=RC011459671033.*

(Continued)

*Primary Examiner* — Laurie Ries
*Assistant Examiner* — Benjamin Smith
(74) *Attorney, Agent, or Firm* — John D. Flynn; Jeffrey L. Streets (57) ABSTRACT

Methods, computer program products and systems are provided for navigating a display of a table in a computer application that includes enabling a context sensitive action menu, detecting activation of the action menu in the displayed table, and executing a table display control instruction from the context sensitive action menu to reformat and redisplay the table in a collapsed or an expanded format around one or more selected cells of the table. The display instruction indicates which columns, etc. are to be reformatted. Further steps may include populating an array with data from corresponding cells of the table and executing an array display control instruction to display at least a portion of the array on an action menu display panel. Navigation tools provide selection of array elements and reformatting and redisplaying the table in the collapsed or the expanded format around a table cell corresponding to the selected array cell.

18 Claims, 7 Drawing Sheets

(56) References Cited

U.S. PATENT DOCUMENTS

| | | |
|---|---|---|
| 2004/0044725 A1* | 3/2004 | Bell et al. .................. 709/203 |
| 2004/0049732 A1 | 3/2004 | Wicks |
| 2004/0085367 A1* | 5/2004 | Hagarty, Jr. ................. 345/854 |
| 2004/0104939 A1 | 6/2004 | Locke |
| 2004/0128275 A1 | 7/2004 | Moehrle |
| 2004/0135809 A1* | 7/2004 | Lehman ..................... 345/767 |
| 2004/0139400 A1 | 7/2004 | Allam |
| 2005/0076312 A1* | 4/2005 | Gardner et al. ............. 715/853 |
| 2005/0149853 A1* | 7/2005 | Naitou ........................ 715/501.1 |
| 2005/0273762 A1* | 12/2005 | Lesh ........................... 717/115 |
| 2006/0031776 A1* | 2/2006 | Glein et al. ................ 715/779 |
| 2006/0242557 A1* | 10/2006 | Nortis, III ................... 715/509 |
| 2007/0208992 A1* | 9/2007 | Koren ......................... 715/503 |
| 2008/0104091 A1* | 5/2008 | Chin ........................... 707/100 |
| 2009/0031230 A1* | 1/2009 | Kesler ......................... 715/764 |

OTHER PUBLICATIONS

Special Edition Using® Microsoft® Office Excel 2003; By: Patrick Blattner Publisher: Que Publication Date: Sep. 11, 2003; Special Edition Using MS EXCEL 2003—Blattner.pdf.*

Examiner Created Screen Shots from Microsoft EXCEL 2003; EXCEL 2003 autofilter Screen Shots.pdf.*

* cited by examiner

FIG. 1

| CUSTOMER NAME | CUSTOMER ADDRESS | CUSTOMER CITY | CUSTOMER STATE | CUSTOMER INVOICE |
|---|---|---|---|---|
| ADAMS | 105 CHERRY DR. | ATLANTA | GA | $45 |
| BROWN | 253 APPLE DR. | BOSTON | MA | $74 |
| CLARK | 389 PEAR DR. | COLUMBUS | OH | $60 |
| DUNCAN | 472 ORANGE DR. | DETROIT | MI | $35 |
| EMERSON | 876 GRAPE DR. | EDMONTON | KY | $93 |
| FORREST | 748 BERRY DR. | FRANKLIN | TN | $53 |
| POTTER | 432 APRICOT DR. | PITTSBURG | PA | $78 |
| QUINN | 619 PLUM DR. | QUAY | NM | $89 |
| ROARK | 837 BANANA DR. | RALEIGH | NC | $43 |
| SMITH | 842 NECTAR | SALEM | MA | $57 |
| TYLER | 682 PEACH | THEON | TX | $91 |
| UNDER | 733 KIWI | URIE | WY | $68 |

NAVIGATING TABLE DATA WITH MOUSE ACTIONS

BACKGROUND OF THE INVENTION

1. Field of the Invention

This invention relates to the field of information technology and electronic data presentation and more particularly to methods and systems for navigating and accessing data.

2. Description of the Related Art

Computer systems typically provide users with access to a wide variety of digital information and services. For example, desktop computer systems usually provide a wide variety of applications along with Internet access. In addition, desktop computer systems commonly provide powerful processing and memory resources and graphics capabilities. A typical desktop computer system includes a large display and a box or tower that houses resources such as processors, memory, and mass storage, etc. Such a desktop computer system may also include a variety of peripheral devices such as printers, scanners, and devices to communicate with a user, such as a keyboard and a pointing tool, such as a mouse. In additional to the common desktop computer system, computer systems also include, for example, laptops, personal digital assistants, main frame computers and notebook computers.

Data is often presented to a user on a computer in a list format but more often is presented in a table format that comprises rows and columns of data. Examples of typical programs utilizing the table format for displaying data include, for example, spreadsheet programs, database programs and word processing programs. Tables are also extensively used in providing information on a Web page by downloading the information from an Internet or intranet site to a browser with instructions to display the data in table format.

With the increasing popularity of the Internet, HTML documents or files are a popular and internationally accepted format for sharing data "on-line." An on-line information system typically includes a server computer system that makes information available so that client computer systems can access the information. The server and client computer systems are usually connected in either a local area or a wide area private Intranet system, or via the public Internet. A unique uniform resource locator (URL) is associated with each HTML document, enabling the client computer systems to request a specific HTML document from a server computer system.

An HTML document includes a hierarchical set of markup elements. Most elements have a start tag, followed by content, followed by an end tag. The content is typically a combination of text and nested markup elements. Tags, which are enclosed in angle brackets ('<' and '>'), indicate how the document is structured and how to display the document, i.e., its format. There are tags for markup elements such as titles and headers, for text attributes such as bold and italic, for lists and for tables.

As noted above, a user who wishes to retrieve and display an HTML document generally uses a Web browser program. Two of the popular Web browser programs are MOZILLA FIREFOX from the Mozilla Foundation of Mountain View, Calif., and INTERNET EXPLORER from Microsoft Corporation of Redmond, Wash. The primary functionality of web browsers is directed to finding, retrieving, and displaying documents. A browser is generally not intended for word processing or data manipulation of the information contained within an HTML document, but can display documents or data generated by word processing or spreadsheet applications, once converted into an appropriate HTML compatible format.

A wide variety of data may be shared among different users in a network environment using HTML. Typical HTML documents include images, text, tables and data. As is well known, an HTML table consists of headers, rows and columns. A column represents a type of data. A header is used to display a proper name for each column. A row is a set of data that consists of one datum from each column.

Tables can be quite large, whether they appear in spreadsheet or database programs or as tables that are read by a browser and downloaded from the Internet or an intranet as an HTML or other suitable format document. Often, when the table cannot fit onto the display screen of a user, the user may navigate through the table by, for example, paging through the table and/or scrolling through the table as known to those having ordinary skill in the art. Such scrolling can be tedious, time-consuming and frustrating, potentially causing the user to lose orientation in the table. Improved displaying, viewing and navigating systems and methods would be desirable, particularly for data displayed and accessed from a regimented format.

SUMMARY OF THE INVENTION

Embodiments of the present invention include methods, computer program products and systems for navigating a display of a table in a computer application. A particular embodiment of a method of the present invention includes the steps of enabling a context sensitive action menu and detecting activation of the action menu in the displayed table. The displayed table may be, for example, at least a part of an HTML document displayed on a browser or a part of a document of another application for displaying regimented data. The particular embodiment may further include the step of executing a table display control instruction from the context sensitive action menu to reformat and redisplay the table in a collapsed or an expanded format around one or more selected cells of the table. The table display control instruction may include a selection of which columns, rows, cells or combinations thereof of the table are to be redisplayed in the collapsed or the expanded format.

Particular embodiments of the present invention may further include the step of maintaining a copy of the document that includes the table so that the source of the document, such as a website, for example, does not have to be re-accessed to obtain an original copy. The method may further include the steps of reformatting the table of the document copy to generate the collapsed or the expanded format and generating a display copy of the document comprising the reformatted table. A further step may include displaying the display copy of the document to redisplay the table in the collapsed or expanded format. The collapsed or expanded format includes at least a portion of a row, a column or a combination thereof that contain the one or more selected table cells.

The table may be reformatted and redisplayed as one or more defined columns, one or more defined rows, one or more defined cells or combinations thereof. The defined rows, columns and/or cells may be defined by default formatting instructions, entered formatting instructions or combinations thereof. For example, a displayed table may be reformatted and redisplayed as one column that includes the selected cell, as two columns that include the column with the selected cell plus the column to the right of that column or as the column with the selected cell plus the column that is two columns over to the right. Any designation may be used to identify the defined rows, columns and/or cells of the reformatted and redisplayed table. It should be noted that the reformatted table does not have to consist only of contiguous columns, rows and/or cells from the original table.

Advantageously, particular embodiments of the present invention may include steps of identifying a name for each column, each row or combinations thereof of the table and displaying the identified names corresponding to each column, each row or combinations thereof in the redisplayed table. This provides the end user with a sense of orientation within the collapsed or expanded table by providing the identification of the rows and columns even when the row or column containing the names are not included in the defined rows, columns or cells to be displayed.

Particular embodiments of the present invention provide additional steps and/or systems for navigating a display of a table in a computer application. Such steps may include populating an array with data from the table, wherein each cell of the array corresponds to a corresponding cell in the table and wherein each cell of the array contains the data from each corresponding cell in the table. The defined array is useful for navigation of the table. The method may further include executing an array display control instruction to display at least a portion of the array on an action menu display panel. Populating the array with the corresponding data from the table may be performed dynamically or statically.

The portion of the array displayed within the action menu display panel may include one or more defined array columns, one or more defined array rows, one or more defined array cells or combinations thereof. The defined rows, columns and/or cells may be defined by default formatting instructions, entered formatting instructions or combinations thereof. In particular embodiment of the present invention, the displayed portion of the array may include an array cell corresponding to a selected cell from the table.

To provide the navigation functions, embodiments of the present invention may additionally include providing one or more array navigation tools on the action menu for scrolling through the array, paging through the array or combinations thereof. Navigation instructions may be received through the one or more navigation tools, thereby changing the at least a portion of the array displayed on the action menu display panel in accordance with the navigation instructions received through the navigation tools.

Particular embodiments may further include selecting an array cell displayed on the action menu display panel and executing an instruction entered from the action menu to reformat and redisplay the table on the browser in the collapsed or the expanded format around a table cell corresponding to the selected array cell.

In addition to the method embodiments discussed above, the present invention includes embodiments implemented as computer program products having a computer useable medium including computer usable code for navigating a display of a table in a computer application. Particular embodiments of the present invention implemented as computer program products include a computer useable medium having computer usable code for navigating a display of a table in a computer application, computer useable program code for detecting activation of the action menu in the displayed table and computer useable program code for executing a table display control instruction from the context sensitive action menu to reformat and redisplay the table in a collapsed or an expanded format around one or more selected cells of the table.

Particular embodiments of computer program products of the present invention may further include computer useable program code for maintaining a copy of a document that includes the table, reformatting the table of the document copy to generate the collapsed or the expanded format, generating a display copy of the document comprising the reformatted table, and for displaying the display copy of the document to redisplay the table in the collapsed or expanded format, wherein at least a portion of a row, a column or a combination thereof containing the one or more selected cells of the table is displayed.

The particular embodiments may further include computer useable program code for populating an array with data from the table, wherein each cell of the array corresponds to a corresponding cell in the table and wherein each cell of the array contains the data from each corresponding cell in the table and for executing an array display control instruction to display at least a portion of the array on an action menu display panel.

The present invention further includes particular embodiments of a system for navigating a display of a table in a computer application. In a particular embodiment, the system includes one or more processors coupled to one or more memory devices and input/output devices, wherein the input/output devices include a display. A first file is loaded into one or more of the memory devices, wherein the file comprises a table having data for display in table format on the display. The system further may include a navigation application having a logical structure to provide instructions to the one or more processors for enabling a context sensitive action menu, detecting activation of the action menu in the displayed table and executing a table display control instruction from the context sensitive action menu to reformat and redisplay the table in a collapsed or an expanded format around one or more selected cells of the table.

The particular embodiment may further include an array defined within the one or more memory devices that is populated with data from the table, wherein each cell of the array corresponds to a corresponding cell in the table and wherein each cell of the array contains the data from each corresponding cell in the table. The navigation application may further provide instructions to the one or more processors for executing an array display control instruction to display at least a portion of the array on an action menu display panel.

The particular system may further include one or more navigation tools displayed on the action menu to provide instructions to the one or more processors to scroll through the array with the navigation application further providing instructions to the one or more processors for selecting an array cell displayed on the action menu display panel and for executing an instruction entered from the action menu to reformat and redisplay the table on the browser in the collapsed or the expanded format around a table cell corresponding to the selected array cell.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

The present invention provides systems, computer program products and methods that are useful for controlling the display of a web page containing a table. While the field of electronic data presentation on a browser includes a wide variety of programs and programming languages, those having ordinary skill in the art will appreciate that the present invention may be implemented without limitation to a particular program or programming language, a particular browser or application for displaying a table or data structure or a particular system. Therefore, while many of the embodiments of the present invention are described herein in the context of HTML tables displayed on a browser, the present invention is not so limited as to apply only to web-displayed documents. Other formats useful for presenting regimented data (e.g., tables, database), including those having more than two dimensions, are equally suitable for application of the present invention such as, for example, non-web graphical user interfaces, including database and spreadsheet applications.

Particular embodiments of the methods, computer program products and systems of the present invention include reformatting and redisplaying the contents of the table as collapsed columns and/or rows around one or more selected cells of the table. In a particular method of the present invention, the method includes the steps of enabling a Navigation menu, which is a context sensitive action menu, and detecting activation of the Navigation menu in a table displayed in a browser or other application program. The method further includes the step of executing a data display control instruction from the Navigation menu to reformat and redisplay the table data in a collapsed or expanded format around the one or more selected cells of the table, wherein at least a portion of a row, a column or a combination thereof that contains the one or more selected cells are displayed.

The term "data," as used herein, is broadly construed as being the contents displayed and/or contained within the table. The data within the table may include, for example, text, alphanumeric characters, formulas, hyperlinks, any object representation and combinations thereof.

The term "pointer," as used herein, is a common pointer as may be controlled by a standard mouse, trackball, keyboard pointer, touch screen or any user manageable device and is used in the broadest sense the context permits to refer to any one or more of these or similar navigation tools. The present invention is not limited to any particular pointing device, and may be implemented in various ways without affecting the functionality of the invention.

Associated with the pointer, using the term as broadly defined above, is the Navigation menu. Conventionally, a context sensitive menu is enabled and displayed in response to a user action performed on a pointer device; e.g., clicking the right mouse button within, for example, a WINDOWS-compatible application. The context sensitive menu may include a variety of options, depending, for example, on the type of the application, the state of the application, the location of the pointer within the application when the menu is enabled and the like. It is known that the context sensitive menu provides quick access to a subset of functions that are particularly relevant to the window area in which the mouse pointer is located, such as in an HTML table displayed on a browser page, and that the pointer can determine its location as being over, for example, an HTML table as well as over a specific table element, by identifying the HTML table tags that define the table.

In a particular embodiment of the present invention, the Navigation menu may be enabled and activated, for example, upon the user pointing to a selected cell or group of cells, such as a column or row, with a pointer device in the browser displayed table and, if the pointer is a mouse, right clicking the mouse. In particular embodiments, such user action causes the system context sensitive menu, which includes the Navigation menu as a submenu, to appear. The Navigation menu provides user access to the navigation functions that are included in particular embodiments of the present invention. These actions, or other suitable user actions performed with a pointer, enable the Navigation menu, provide detection of the activation of the Navigation menu, cause the Navigation menu to be displayed and allow an end user to select the one or more selected cells.

One of the menu items included on the displayed Navigation menu is a collapse table instruction. The collapse table instruction, when selected, causes the displayed table to be reformatted and redisplayed with only a set number of columns, rows and/or table cells displayed around the one or more selected cells of the table. As noted previously, the selected cell is the cell over which the user caused the action menu to be activated by, for example, right clicking over the selected cell or group of cells. Therefore, in a particular embodiment, upon selection of the collapse table menu selection, the table collapses and displays, for example, one column that contains the selected cell. Alternatively, the table may collapse to display one column and one row that contain the selected cell.

Generally, the method provides for collapsing the table to a one or more defined columns, one or more defined rows, one or more defined cells or combinations thereof around the one or more selected cells. The one or more defined columns, rows, cells and combinations thereof may be selected from default formatting instructions, entered formatting instructions or combinations thereof. The default formatting instructions may, for example, be configured with the context sensitive menu having a "setup" feature. The entered formatting instructions, which are customized formatting instructions, may be entered, for example, through a dialogue box displayed upon selection of the collapse table menu choice or a "customize" menu choice from the context sensitive menu.

After the table has been reformatted and redisplayed in a collapsed column format, the user may choose to select one or more of the cells displayed in the collapsed format and then display the Navigation menu again for selecting the collapse or expand table menu choice on the newly, selected cell. For example, an end user may select to display columns 1 and 3 but not column 2. The columns or rows displayed in the reformatted and redisplayed table do not have to be contiguous rows and/or columns.

It should be noted that the use of a dialogue box for communication with an end user and for the receipt of instructions from the end user where described herein is not meant to limit the present invention. Instructions from and communications with an end user may also be provided from a properties file that is populated with default or custom instructions, with popup menus that automatically provide a recommendation based upon the end user's last behavior on a Web page with a table, by other means known to those having ordinary skill in the art and combinations thereof.

Another of the menu items included on the displayed Navigation menu may be a restore and/or an expand table instruction. The expand table instruction, when selected, causes the displayed table to be reformatted and redisplayed with an increased set number of columns and rows displayed around the one or more selected cells of the table. The restore table instruction causes the displayed table to reformat and display as the table was originally displayed before being reformatted through a collapse or expand table instructions. Upon selection of the expand table menu selection, the table expands and displays additional columns or portions of columns adjacent to the one or more selected cells. The method may provide for expanding the table to one or more defined columns, rows, cells or combinations thereof around the one or more selected cells as designated by default formatting instructions or entered formatting instructions. As discussed above, reformatting and redisplaying the table does not require displaying only contiguous rows, columns and/or cells. For example, an end user may expand a table around a selected cell by ordering that columns 1-2 and 5-6 be displayed in the reformatted and redisplayed table but not columns 3-4.

In particular embodiments of the present invention, reformatting and redisplaying a table contained within an HTML document in an expanded or collapsed format may be accomplished by manipulating a copy of the downloaded HTML document. For example, upon downloading an HTML document containing a table and displaying the document through a browser or other suitable applications program, a copy of the document containing the table within the document may be stored or cached in memory for later reformatting and redisplaying according to particular embodiments of the present invention. As known to those having ordinary skill in the art, the entire description of the format, contents and other relevant attributes of a table contained within an HTML document are contained between a table start and a table end point within the document.

For example, a browser reads a start of the table in the HTML language as "<table>" and an end point of the table as "</table>." The information between these start and endpoints provide the data, formats and instructions required by the browser or other application program to display the table within the HTML document. This information can be stored, parsed, manipulated and copied to create a new display document having the table in its collapsed or expanded format as desired. For example, to collapse the table, all the information about the table that is not to be displayed in the collapsed format may be identified between the "start table" and "end table" tags and then deleted or commented out (designated as being comments and therefore ignored by the application program) from a display copy of the HTML document. The application program, such as a browser, may then execute the newly formed display copy of the HTML document to redisplay the HTML document in the reformatted condition with the table in the collapsed format. In this manner, contact with the original source of the HTML document, such as a Web site, is not necessary to redisplay the HTML document and the original copy of the document is maintained for further manipulation for reformatting and redisplaying the table. Optionally, an icon, such as an accordion, may be displayed in the redisplayed document to remind the user that the document is not displayed in the original format but is a copy that has been reformatted and redisplayed.

If there is more than one table in an HTML document, each table may be separately manipulated for display in a collapsed or expanded format within the displayed document. For example, if a first table within a document has already been reformatted and redisplayed in a revised format (collapsed or expanded), then an end user may be given the choice between reformatting and redisplaying a second table in a revised format with the first table in its original format or in its revised format. If the end user decides to reformat and redisplay the second table with the first table in its original condition, then the originally saved document is reformatted and redisplayed according to the instructions regarding the second table. However, if the end user decides to reformat and redisplay the second table with the first table in its revised format, then the "display copy" of the document having the revised format of the first table is reformatted and redisplayed according to the instructions regarding the second table.

Table column and row titles or names may also be displayed with the collapsed or expanded tables in the reformatted and redisplayed format. Displaying the column and row names is especially desirable when the table is collapsed or expanded to only a set number of cells around the selected cell such that entire rows or columns are only partially, and not totally displayed.

Therefore, in particular embodiments of the present invention, a step of identifying a name for each column, each row or combinations thereof is performed. In some applications, the names of the columns and rows may be identified by reading the HTML tags that identify the titles and rows as containing the names thereof. Optionally, a dialogue box may be opened that requests the end user to designate which row and column contains the names of the columns and rows, respectively. Such indication may be made, for example, by requesting the end user to use the pointing device to point out the column and row containing the names.

After identifying the names of the columns and/or rows, a further step may include displaying the identified names with the corresponding data displayed in the collapsed or expanded table. Advantageously, when only a portion of a column or row is displayed and that portion does not include the first cell of the column or row that typically includes the name, the name of the column or row is still displayed to provide the user with the context of the displayed data.

In particular embodiments of the present invention, the Navigation menu may further display at least a portion of the table within a List area, which is a separate display panel associated with the Navigation menu. The List area associated with the Navigation menu may be contained within the bounds of the Navigation menu display itself or may be a separate popup display panel. Displaying at least a portion of the table within the List area provides both an additional display for portions of the table that are of interest and also a navigation tool useful for navigating the table.

To display at least a portion of the table within the List area, according to particular embodiments of the present invention, an array may be defined that preferably has the same number of rows and columns as the table, if the table is two dimensional. If the data is in a regimental format having three or more dimensions, then a suitable data structure of more than two dimensions would be defined. The defined array may then be populated with the corresponding data from the table so that, for example, the first cell of the first column is the same in both the table and the array. The array may be defined in a memory and populated either dynamically or statically.

Particular embodiments of the present invention include displaying data in the List area from a set portion of the array. The set portion of the array that is displayed may vary in size but, after one or more cells are selected from the table, the set portion may include the array cell that corresponds to the one or more selected cells of the table. The set portion of the array may further include at least a portion of the row and/or a portion of the column that contains the one or more selected cells.

However, it should be noted that there is no limit as to the number of cells that may be displayed on the List area other than the available area for display. The display format of the set portion of the array that is displayed on the List area may include one or more array columns, one or more array rows, one or more array cells or combinations thereof. For example, a user may decide to display two rows: one row with a selected cell plus the row above the selected cell. As an alternative display format, for example, a user may decide to allow a default number of rows and/or columns to be displayed such as, for example, just one row and/or just one column that includes the selected cell. Selection of the display format of the set portion of the array to be displayed on the List area may be made, for example, through the Navigation menu that appears after the end user has selected a cell in the table. Alternatively, default format definitions may be applied.

Optionally, the column names and the row names may also be displayed with the corresponding rows and columns that are displayed on the List area. The table column and/or row that contain the names may be discovered as discussed above for the identity of the names used in the table. Optionally, after the name row and column have been discovered for the table, the corresponding row and column of the array may be used without further inquiry or determination.

Particular embodiments of the present invention further include navigation tools located on the Navigation menu for navigating the array displayed on the List area or to filter out and display a subset of data. Advantageously, navigating through the array displayed in the List area further provides navigation of the displayed table, e.g., as an HTML table on the browser. The navigation tools displayed in the action menu may include, for example, scrolling tools for scrolling through a displayed page and/or scrolling through a multi-page table by pages, such as page up or page down.

Navigation of the table is achieved by the interaction of instructions received from the Navigation menu and from the activated pointing device in the table. For example, by using the navigation tools on the Navigation menu, an end user may scroll through the array away from the selected cell and find one or more new cells of interest. By selecting a new cell of interest by, for example, clicking on the new cell of interest in the array display, a new cell is selected as the selected cell, and the table displayed on the browser may be redisplayed with the new selected cell displayed in the selected format.

Therefore, the end user may provide an instruction, by using a pointer device activated within the table displayed within the browser or other application, to display a set portion of the array within the List area. Similarly, the end user may provide an instruction, by using a pointer device activated within the List area, to display a set portion of the table on the browser or other application. From the table, the end user may instruct the List area to display a portion of the array that corresponds to a selected table cell such as, for example, displaying the entire row containing a cell selected from the displayed table.

Figure 1:
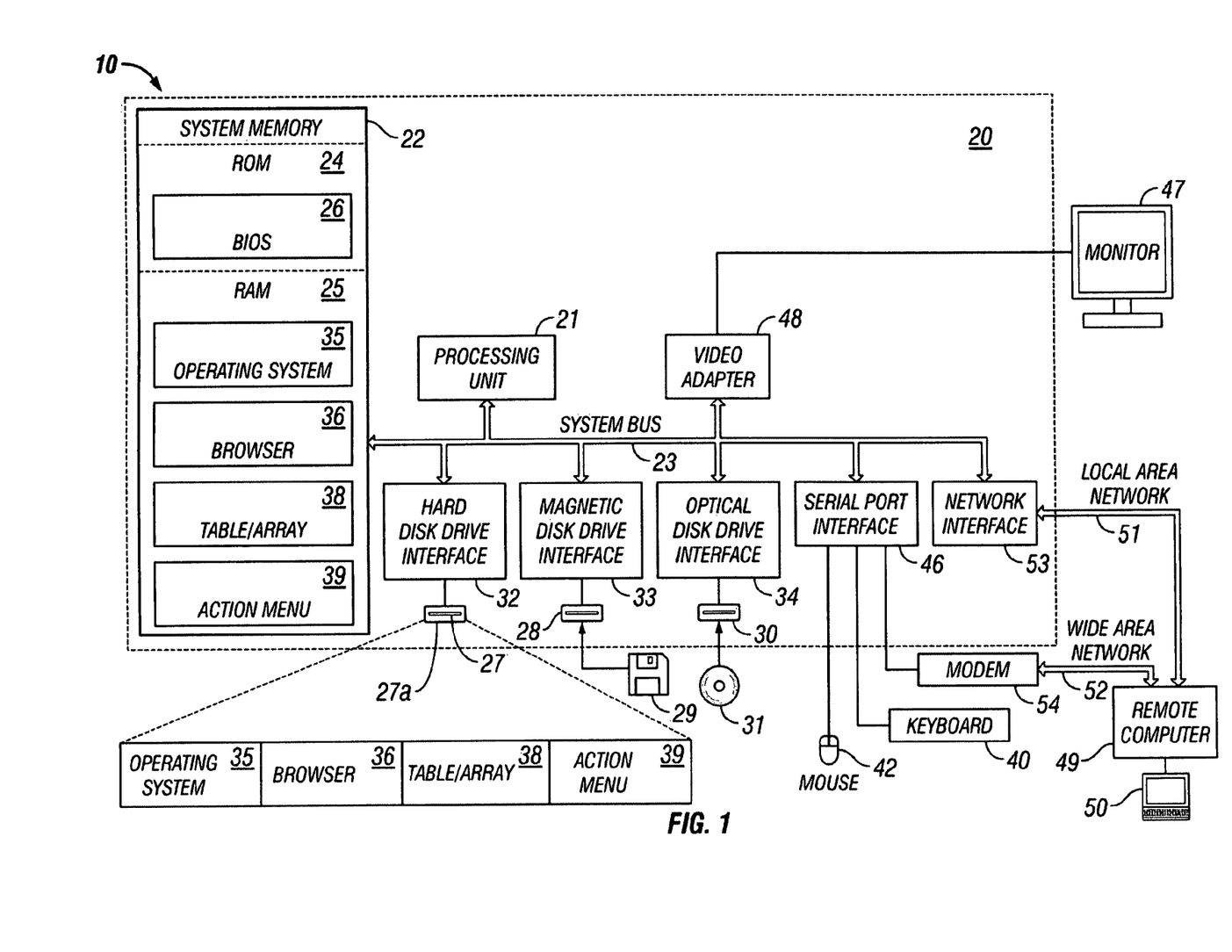
FIG. 1 is a schematic diagram of a system that is suitable for reformatting and redisplaying table data with mouse actions.

FIG. 1 is a schematic diagram of a system that is suitable for navigating table data with mouse actions. The system 10 includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27a for reading from and writing to a hard disk 27, a magnetic disk drive 28 for reading from or writing to a removable magnetic disk 29, and an optical disk drive 30 for reading from or writing to a removable optical disk 31 such as a CD-ROM or other optical media. Hard disk drive 27a, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, the operating system 35 and a browser 36 may be stored in the RAM 25 and/or hard disk 27 of the personal computer 20.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, a mainframe, a personal digital assistant, an Internet-connected mobile telephone or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing high-speed communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

A number of program modules may be stored on hard disk 27, magnetic disk 29, optical disk 31, ROM 24, or RAM 25, including an operating system 35, a browser 36, a table and array 38, and an action menu 39. Program modules include routines, sub-routines, programs, objects, components, data structures, etc., which perform particular tasks or implement particular abstract data types. Aspects of the present invention may be implemented in the form of an action menu module 39 that can be incorporated into or otherwise in communication with a browser program module 36. The browser program module 36 generally comprises computer-executable instructions for displaying, inter alia, HTML documents that contain tables 38. The action menu module 39 generally comprises computer-executable instructions for providing instructions for selection by an end user and a display area for displaying portions of the array 38. The action menu 39 is generally accessible to the browser 36.

The described example shown in FIG. 1 does not imply architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

It should be recognized therefore, that embodiments of the present invention may take the form of an entirely hardware embodiment, an entirely software embodiment or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain or store the program for use by or in connection with the instruction execution system, apparatus or device.

FIGS. 2A-2D are diagrams of a user interface showing a table and a Navigation menu employing an exemplary embodiment of the present invention. A user interface 60 displays a portion 61*a* of a table 61 as, for example, an HTML document or other application document suitable for displaying regimented data. The upper portion of the table 61*a* is displayed on the user interface 60 to fill the available display area of the output device, such as a monitor 47 (See, FIG. 1) while the rest of the table 61*b* may be displayed by scrolling down the document using the scroll bar 68 as known to those having ordinary skill in the art.

The user interface 60 may be, for example, a browser. While the table 61 is shown as a two dimensional table, it should be recognized that the invention is not limited to operation in only two dimensions and may be applied to any data structure of any dimensions. The table 61 and Navigation menu 65 are shown for illustrative purposes and are not meant to limit the invention in any way. The table 61 and Navigation menu 65 are displayed on the user interface 60 through an output device, such as on the monitor 47, as a graphical display with the contents of the table cells 63 stored in memory (See, FIG. 1).

Figure 2A:
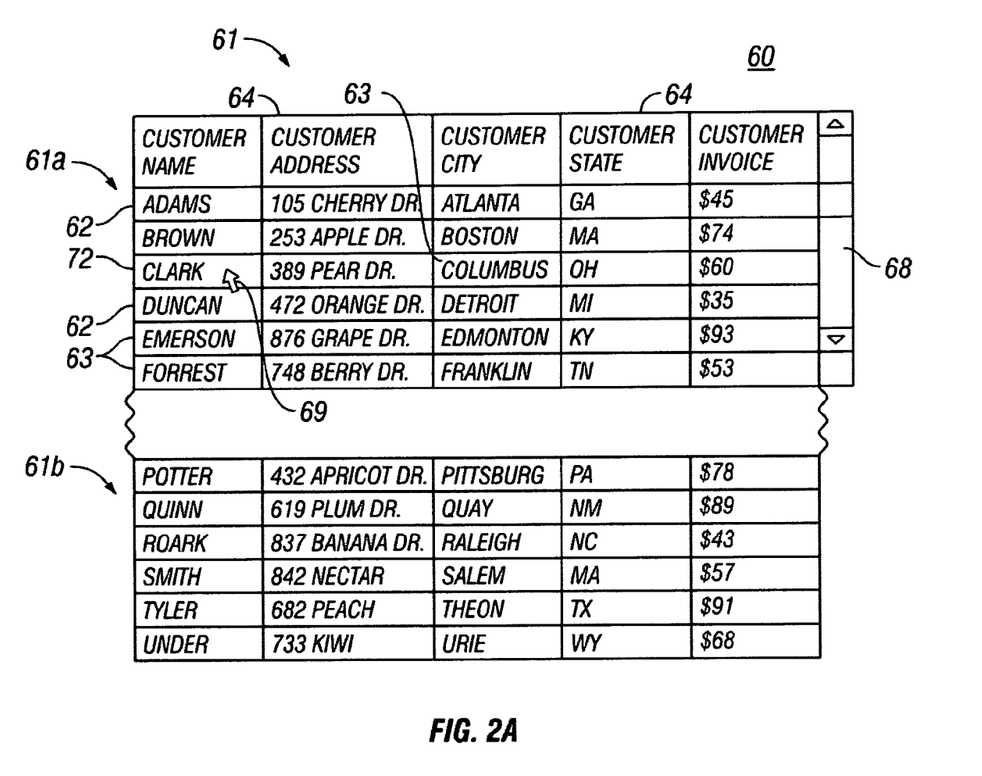
FIGS. 2A-2D are diagrams of a user interface showing a table and a Navigation menu employing an exemplary embodiment of the present invention.
Figure 2B:
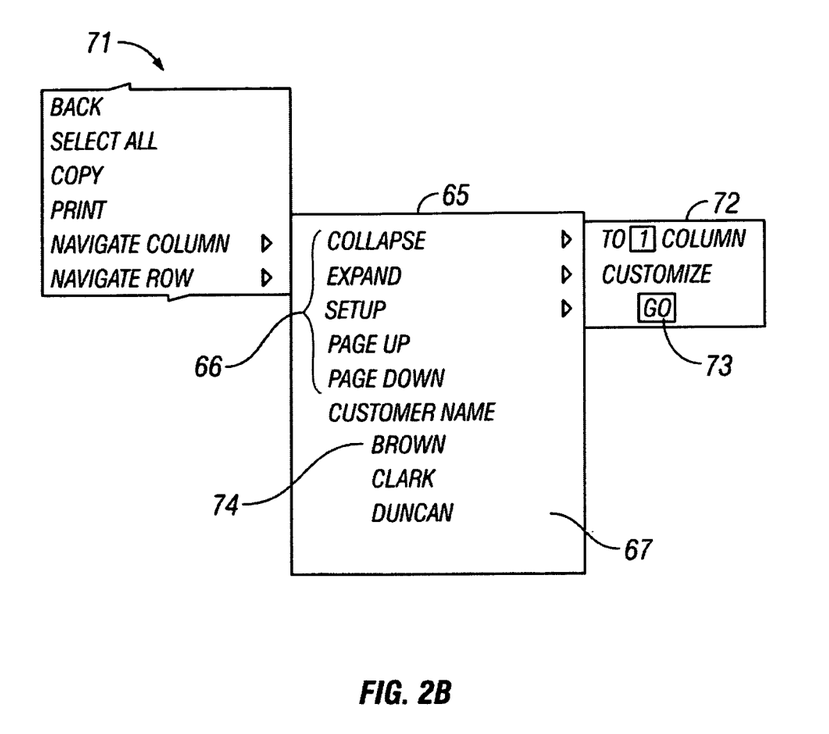

Referring to FIG. 2A and FIG. 2B, the table 61 comprises columns 64 and rows 62 and individual cells 63. The cells 63 are populated with data, which includes the names, addresses and invoice amounts relating to various customers. Using a pointing device 42 (See, FIG. 1), an end user places a pointer 69 over one of the individual cells 63 and right clicks to enable and display the context sensitive action menu 71, which comprises the Navigation menu 65, and to identify a selected cell 72. The Navigation menu 65 includes menu choices 66 that an end user may select and activate as an instruction by, for example, clicking with the pointing device placed over one of the menu choices 66. The Navigation menu 65 further includes the List area 67 for displaying a portion 74 of the data from the table 61, which in this exemplary example are the names from the first column 64 of the table 61. The portion 74 of the data displayed in the List area 67 may be determined, as discussed above, either by a default format instruction or by a customized format instruction. The customized format may be entered, for example, through the sub-menu (not shown) obtained by clicking on the "Setup" menu choice 66 of the Navigation menu 65.

In particular embodiments of the present invention, the "page up" and "page down" menu choices 66 on the Navigation menu 65 may be used to page through the portion 74 of the data displayed in the List area 67 by, for example, the number of data points displayed. For example, since three names are displayed in the List area 67, each "page" of the displayed portion 74 may be three names in length. Therefore, when an end user activates the page down menu choice 66 shown in FIG. 2B, the names displayed in the List Area 67 change to show the next three names, or the next "page" of the displayed portion 74 of the data. Therefore, the names displayed in the List area 67 may then change, for example, to Duncan, Emerson and Forest.

Figure 2C:
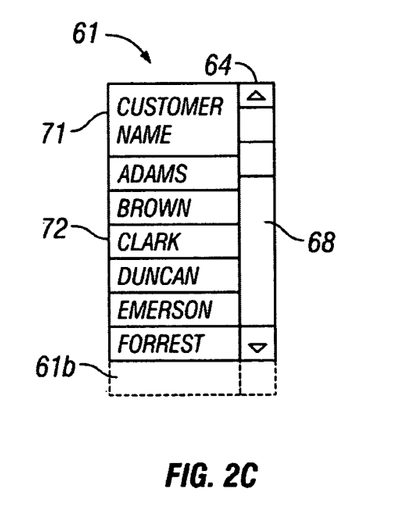

Now referring further to FIG. 2B, upon clicking on the "collapse" instruction 66 on the Navigation menu 65, a new sub-menu 72 may be displayed to allow an end user to insert the number of columns to which the table should collapse or alternatively, to insert instructions for further customization of the reformatted table as desired. Upon the end user inserting a "1" in the provided area of the sub-menu 72 to indicate that the table should collapse to one column, and then clicking on the "OK" button 73, the table 61 collapses to one column 64 that contains the selected cell 72, as shown in FIG. 2C. The table 61 shown in FIG. 2C is collapsed around the selected cell 72 and reformatted and redisplayed on the user interface 60 to show only the column 64 containing the selected cell 72.

Figure 2D:
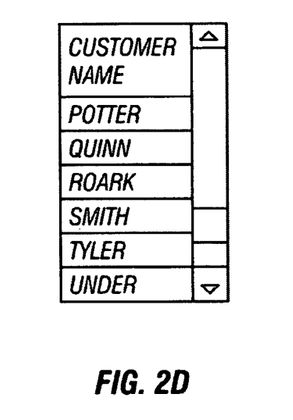

To navigate the table 61 displayed on the browser 60, the end user may, for example, page through the displayed portion 74 showing the names in the List area 67 and select, by using the pointer 69, the name Tyler. The table 61 is then reformatted and redisplayed as the single column centered around the selected name Tyler as shown in FIG. 2D. It should be noted that the List area 67 may be a separate popup display panel containing more columns or rows or cells of data from the array than those displayed in this exemplary embodiment. It should also be noted that in such a display of the array or other data structure, the displayed columns, rows and/or cells would not have to be contiguous as discussed above.

Figure 3A:
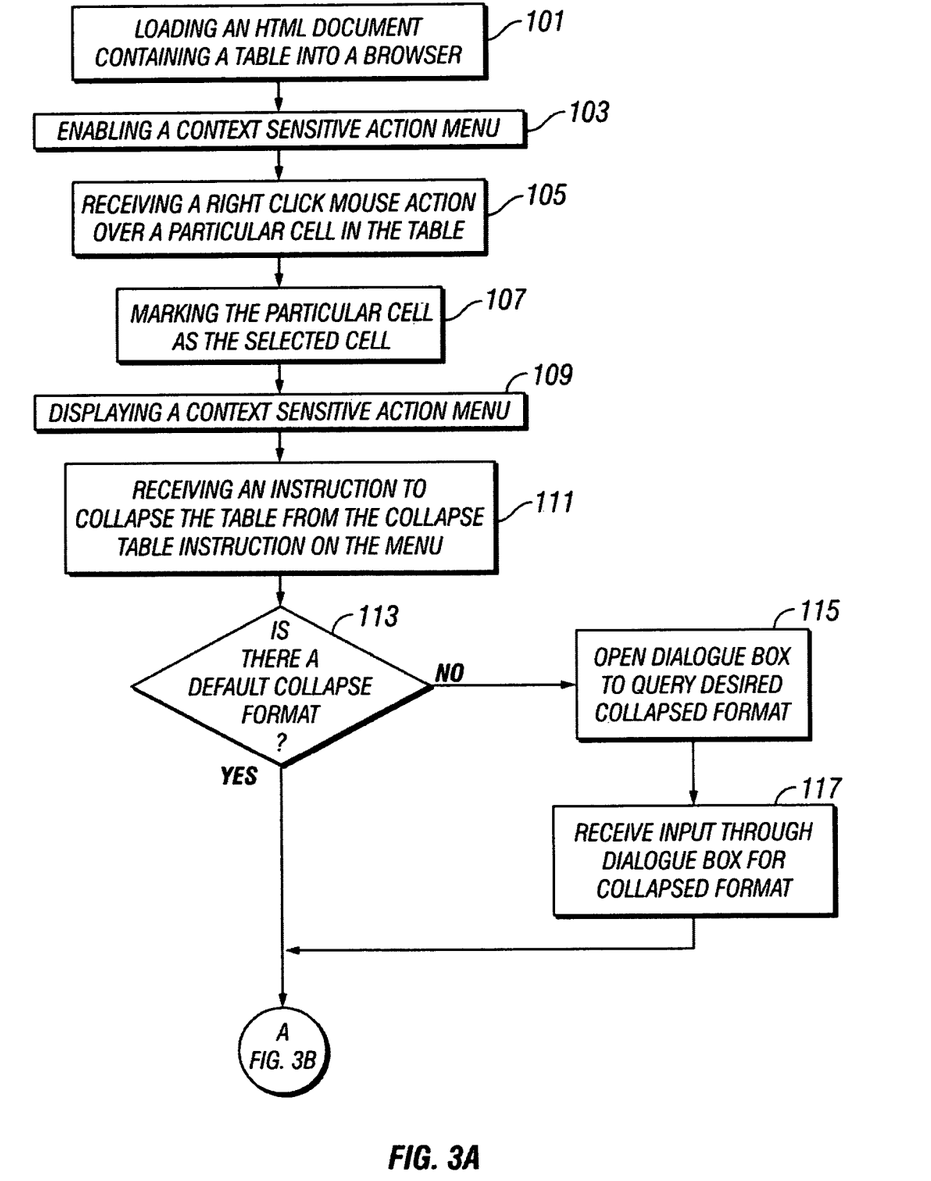
FIGS. 3A-3B are flow charts for reformatting and redisplaying a table in a collapsed format.
Figure 3B:
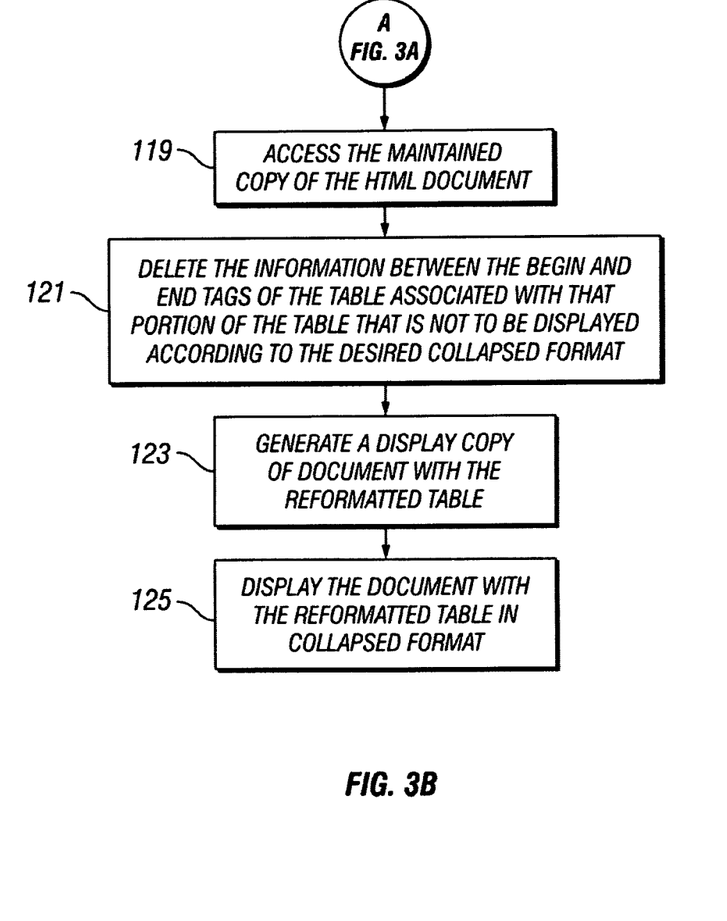

FIGS. 3A-3B are flow charts for reformatting and redisplaying a table in a collapsed format. While inventive embodiments of methods are demonstrated in this and the following flow charts, it should be realized that the demonstrated methods may be implemented using computer code and/or a suitable system. In state 101, an HTML document containing a table is loaded into a browser. In state 103, a Navigation menu is enabled. In state 105, a user right clicks a pointer device, such as a mouse, after placing the pointer over a particular cell. In state 107, the particular cell is marked as the selected cell and in state 109, the Navigation menu is displayed.

In state 111, an instruction to collapse the table is received from the end user by the end user selecting and mouse clicking on the "collapse table" action menu choice with the table in its original state. In state 113, a determination is made whether there is a default collapse format. If, in state 113, there is not a default collapse format, in state 115, a dialogue box is opened to query the end user for the desired collapsed format. In state 117, the user inputs the desired format, such as collapse the table to show only columns 1, 3 and 5 and the desired collapse format is received and the method continues to state 119 of FIG. 3B. If, in state 113, there is a default collapse format, the method continues to state 119 of FIG. 3B.

Continuing to FIG. 3B, in state 119, the exemplary method accesses the maintained copy of the original HTML document that contains the table. The maintained copy is not altered but is maintained as the copy of the original document to provide a copy of the unaltered original document without having to re-access the source from which the original document was obtained. In state 121, the information between the table start and end tags associated with that potion of the table that is not to be displayed in the reformatted and redisplayed table is deleted. In state 123, a display copy of the document with the reformatted table is generated. In state 125, the exemplary method displays the display document with the reformatted table in the desired collapsed format.

Figure 4A:
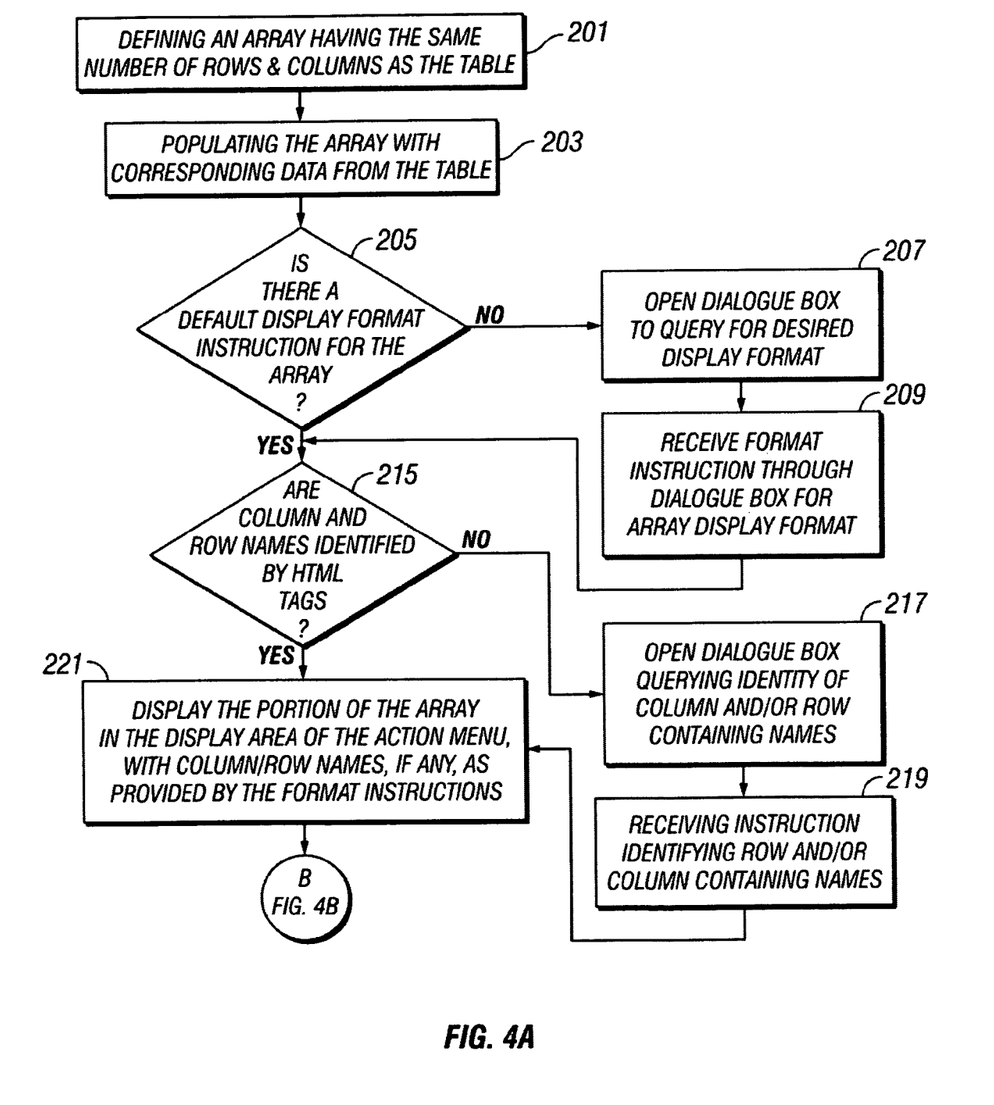
FIG. 4A-4B are flow charts for displaying a portion of an array that corresponds to a table displayed on a browser and for navigating the table using the displayed array.
Figure 4B:
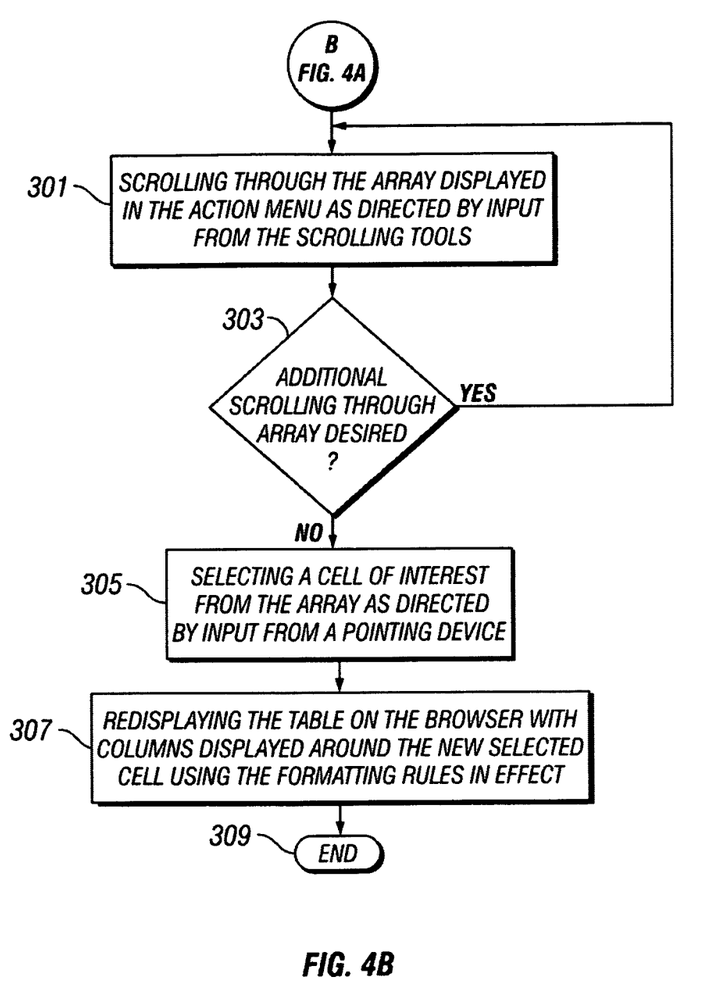

FIGS. 4A-4B are flow charts for displaying a portion of an array that corresponds to a table displayed on a browser and for navigating the table using the displayed array. In state 201, an array is defined having the same number of columns and rows as the table. In state 203, the array is populated with the corresponding data from the table and is stored internally, or example, in XML. In state 205, it is determined whether there is a default display format instruction for the array for displaying a portion of the array in the display area of the action menu. If, in state 205, there is no default instruction, then in state 207, a dialogue box is opened to query for the desired display format. In state 209, a desired format instruction is received through the dialogue box. For example, the desired format may be to display the row of the array that includes the cell corresponding to the selected cell from the table. If, in step 205, there is a default display instruction, then the method continues to state 215.

In state 215, it is determined whether the column and/or row names can be identified by, for example, reading HTML tags such as locating the table's header tags for column titles or the first column in a row for the row titles. If, in state 215, the column and/or row containing the names cannot be identified, then in state 217, a dialogue box is opened to query for the identify of the row and/or column containing the names. In state 219, an instruction is received that identifies the row and/or column containing the names. In state 221, the exemplary method continues with displaying the portion of the array in the display area of the action menu, with column/row names, if any, as provided by the format instructions. If, in state 215, it is determined that the column and/or row names can be identified without further input, then the method continues to state 221 as described above and then continues to FIG. 4B.

Continuing to FIG. 4B and starting with branch B from FIG. 4A, in state 301, the portion of the array displayed on the display area of the action menu is scrolled as directed by input from scrolling tools available on the action menu. In state 303, a determination is made if additional scrolling is desired. If, in state 303, additional scrolling is desired, then the method continues back to state 301. If, in state 303, additional scrolling is not desired, then in state 305, a particular cell of interest is selected as directed by in put from a mouse. In state 307, the table displayed on the browser is redisplayed with the table columns collapsed around the new selected cell according to the formatting currently in effect.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A method for controlling a display of a table in a computer application, comprising:
   enabling a context sensitive action menu;
   detecting activation of the action menu in the displayed table;
   executing a table display control instruction from the context sensitive action menu to reformat and redisplay the table in a collapsed or an expanded format around one or more selected cells of the table;
   populating an array with data from the table, wherein each cell of the array corresponds to a corresponding cell in the table and wherein each cell of the array contains the data from each corresponding cell in the table; and
   executing an array display control instruction to display at least a portion of the array on an action menu display panel.

2. The method of claim 1, further comprising:
   maintaining a copy of a document that includes the table;
   reformatting the table of the document copy to generate the collapsed or the expanded format;
   generating a display copy of the document comprising the reformatted table; and
   displaying the display copy of the document to redisplay the table in the collapsed or expanded format having at least a portion of a row, a column or a combination thereof containing the one or more selected cells of the table.

3. The method of claim 2, further comprising:
   reformatting the table as one or more defined columns, one or more defined rows, one or more defined cells or combinations thereof, wherein the defined columns, rows, cells or combinations thereof are selected from default formatting instructions, entered formatting instructions or combinations thereof.

4. The method of claim 1, wherein the table display control instruction comprises a selection of which columns, rows, cells or combinations thereof of the table are to be redisplayed in the collapsed or the expanded format.

5. The method of claim 1, further comprising:
   identifying a name for each column, each row or combinations thereof of the table;
   displaying the identified names corresponding to each column, each row or combinations thereof in the redisplayed table.

6. The method of claim 1, wherein the step of populating the array with corresponding data from the table is performed dynamically.

7. The method of claim 1, wherein the displayed portion of the array includes one or more defined array columns, one or more defined array rows, one or more defined array cells or combinations thereof, wherein the defined array columns, rows, cells or combination thereof are selected from default formatting instructions, entered formatting instructions or combinations thereof.

8. The method of claim 1, wherein the displayed portion of the array includes an array cell corresponding to a selected cell from the table.

9. The method of claim 1, further comprising:
providing one or more array navigation tools on the action menu for scrolling through the array, paging through the array or combinations thereof;
receiving navigation instructions through the one or more navigation tools; and
changing the at least a portion of the array displayed on the action menu display panel in accordance with the navigation instructions.

10. The method of claim 9, further comprising:
selecting an array cell displayed on the action menu display panel;
executing an instruction entered from the action menu to reformat and redisplay the table on the browser in the collapsed or the expanded format around a table cell corresponding to the selected array cell.

11. The method of claim 1, wherein the table in the computer application is at least a part of a web-displayed document displayed in a browser.

12. A computer program product comprising a non-transitory computer useable medium having computer usable code for controlling a display of a browser page, the computer program product comprising:
computer useable program code for enabling a context sensitive action menu;
computer useable program code for detecting activation of the action menu in the displayed table;
computer useable program code for executing a table display control instruction from the context sensitive action menu to reformat and redisplay the table in a collapsed or an expanded format around one or more selected cells of the table;
computer useable program code for populating an array with data from the table, wherein each cell of the array corresponds to a corresponding cell in the table and wherein each cell of the array contains the data from each corresponding cell in the table; and
computer useable program code for executing an array display control instruction to display at least a portion of the array on an action menu display panel.

13. The computer program product of claim 12, further comprising:
computer useable program code for maintaining a copy of a document that includes the table;
computer useable program code for reformatting the table of the document copy to generate the collapsed or the expanded format;
computer useable program code for generating a display copy of the document comprising the reformatted table; and
computer useable program code for displaying the display copy of the document to redisplay the table in the collapsed or expanded format, wherein at least a portion of a row, a column or a combination thereof containing the one or more selected cells of the table is displayed.

14. The computer program product of claim 12, further comprising:

computer useable program code for providing one or more array navigation tools on the action menu for scrolling through the array, paging through the array or combinations thereof;
computer useable program code for receiving navigation instructions through the one or more navigation tools; and
computer useable program code for changing the at least a portion of the array displayed on the action menu display panel in accordance with the navigation instructions.

15. The computer program product of claim 14, further comprising:
computer useable program code for selecting an array cell displayed on the action menu display panel;
computer useable program code for executing an instruction entered from the action menu to reformat and redisplay the table on the browser in the collapsed or the expanded format around a table cell corresponding to the selected array cell.

16. A system for displaying a table, comprising:
one or more processors coupled to one or more memory devices and input/output devices, wherein the input/output devices include a display;
a first file loaded into one or more of the memory devices, wherein the file comprises a table having data for display in table format on the display;
a navigation application having a logical structure to provide instructions to the one or more processors for enabling a context sensitive action menu, detecting activation of the action menu in the displayed table and executing a table display control instruction from the context sensitive action menu to reformat and redisplay the table in a collapsed or an expanded format around one or more selected cells of the table.

17. The system of claim 16, further comprising:
the navigation application further providing instructions to the one or more processors for maintaining a copy of a document that includes the table in the one or more memory devices;
providing instructions for reformatting the table of the document copy to generate the collapsed or the expanded format;
providing instructions for generating a display copy of the document comprising the reformatted table, and
providing instructions for displaying the display copy of the document to redisplay the table in the collapsed or expanded format, wherein at least a portion of a row, a column or a combination thereof containing the one or more selected cells of the table is displayed.

18. The system of claim 16, further comprising:
an array defined within the one or more memory devices that is populated with data from the table, wherein each cell of the array corresponds to a corresponding cell in the table and wherein each cell of the array contains the data from each corresponding cell in the table;
the navigation application further providing instructions to the one or more processors for executing an array display control instruction to display at least a portion of the array on an action menu display panel;
one or more navigation tools displayed on the action menu to provide instructions to the one or more processors to scroll through the array; and
the navigation application further providing instructions to the one or more processors for selecting an array cell displayed on the action menu display panel and for executing an instruction entered from the action menu to reformat and redisplay the table on the browser in the collapsed or the expanded format around a table cell corresponding to the selected array cell.

* * * * *